J. R. GAST.
Flour-Bolts.

No. 149,464.

2 Sheets--Sheet 1.

Patented April 7, 1874.

WITNESSES
P. C. Dieterich
H. C. Scott

INVENTOR
John R. Gast
C. H. Watson & Co.
ATTORNEYS

2 Sheets--Sheet 2.

J. R. GAST.
Flour-Bolts.

No. 149,464. Patented April 7, 1874.

WITNESSES
P. C. Dietzel
H. C. Scott

INVENTOR
John R. Gast
per C. H. Watson & Co.
ATTORNEYS

AM. PHOTO-LITHOGRAPHIC Co. N.Y. (OSBORNE'S PROCESS)

UNITED STATES PATENT OFFICE.

JOHN REYNOLDS GAST, OF MIFFLINBURG, PENNSYLVANIA.

IMPROVEMENT IN FLOUR-BOLTS.

Specification forming part of Letters Patent No. 149,464, dated April 7, 1874; application filed February 23, 1874.

*To all whom it may concern:*

Be it known that I, JOHN R. GAST, of Mifflinburg, in the county of Union and State of Pennsylvania, have invented certain new and useful Improvements in Flour-Bolts; and I do hereby declare that the following is a full, clear, and exact description thereof, reference being had to the accompanying drawings and to the letters of reference marked thereon, which form a part of this specification.

The nature of my invention consists in the construction and arrangement of a flour-bolt, as will be hereinafter more fully set forth.

In order to enable others skilled in the art to which my invention appertains to make and use the same, I will now proceed to describe its construction and operation, referring to the annexed drawings, in which—

Figure 1:
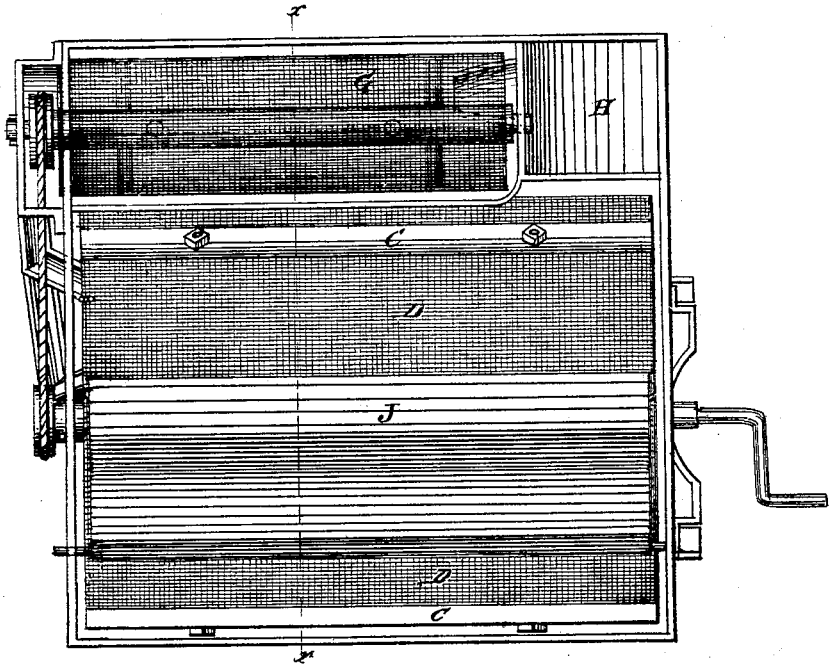
Figure 2:
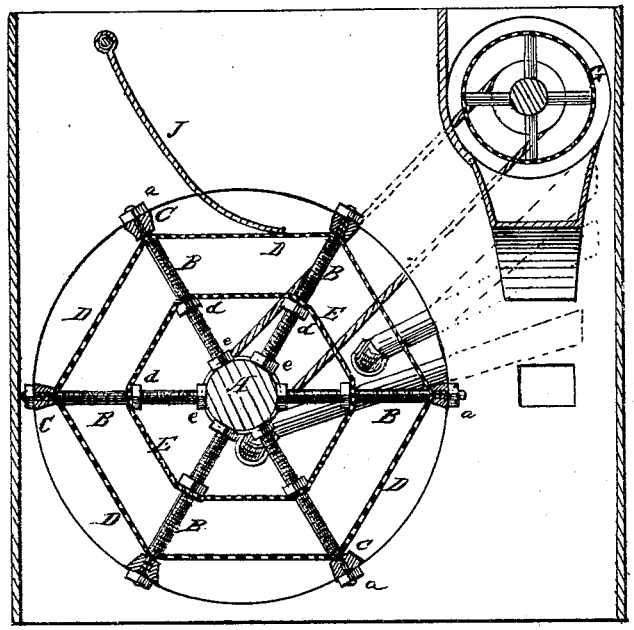
Figure 3:
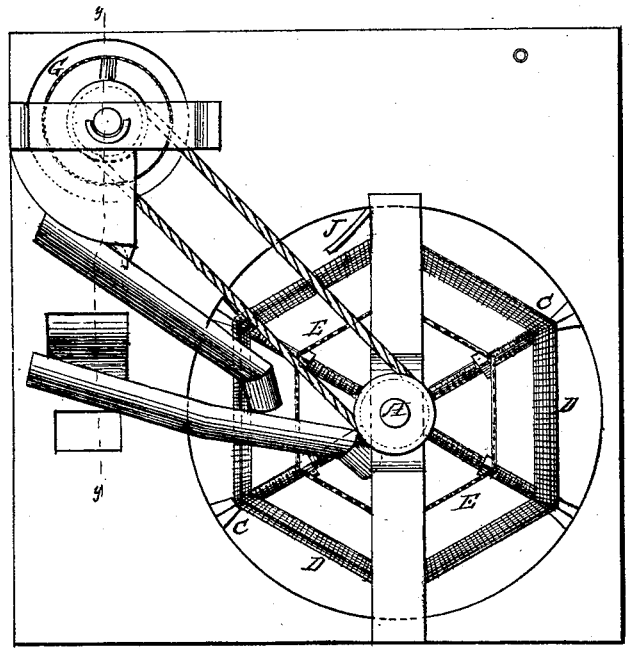
Figure 4:
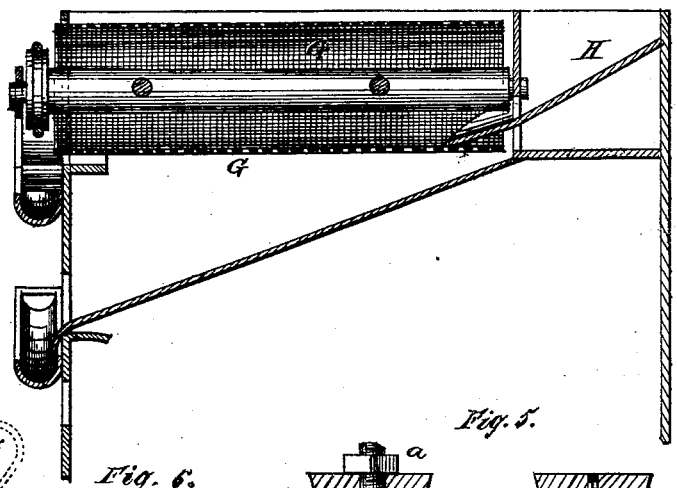
Figures 5, 6:
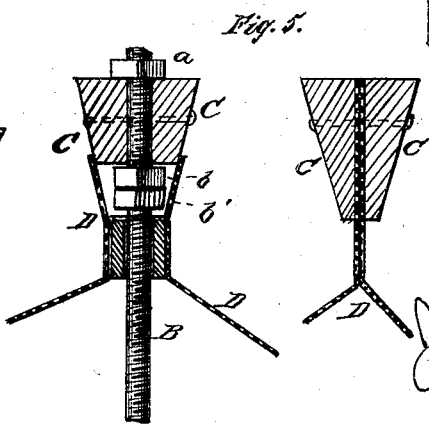

Figure 1 is a longitudinal section; Fig. 2, transverse vertical section through line $x\,x$, Fig. 1. Fig. 3 is an end view. Fig. 4 is a detail section through the line $y\,y$, Fig. 3. Fig. 5 is a section of the ribs, showing attachment of the cloth; and Fig. 6 shows spout and valves.

A represents the central shaft of my flour-bolt, through which are passed rods or arms B B, at suitable points, for supporting the ribs C C, to which the bolting-cloth D is secured. In order to get the benefit of all the cloth the ribs C C are placed on the outside thereof in the following manner: Each rib is made triangular in form, of two longitudinal sections, suitably fastened together, and the arms B pass through the ribs. The ribs are placed with the points inward and the base outward, and forced, by a nut, $a$, upon the outer end of the arm, against a nut, $b$, farther in on said arm, and this latter nut prevented from turning by means of a jam-nut, $b'$. The two nuts $b\,b'$ are hid within the rib by entering recesses made for that purpose in the same. The edges of the bolting-cloth D are inserted between the two sections of the rib, and glued fast, the whole seam being then coated with varnish. This prevents the lodgment of bugs or mill-worms. The recesses for the nuts $b\,b'$ are covered with varnished cloth for the same purpose. The only obstruction for the flour to slide on the cloth is the arms B B. Within the bolt thus constructed is a wire-cloth screen, E, secured on the arms B B, and extending the entire length of the bolt. This screen is for the purpose of separating the greater part of the bran and middlings from the flour without coming in contact with the cloth; and thus, by removing the greater part of the labor from the cloth, it admits of using a very much smaller amount of cloth to perform the same labor, and with less wear and tear upon the same. By the use of the interior screen E the chop is also distributed over the cloth, instead of being thrown upon it in a body, as done in the bolts now in use.

In flour-bolts where the ribs are on the inside the chop is carried up to a perpendicular height, and then drops down, so that but one-sixth of the cloth can be used. This also causes the forcing through of small particles of bran and black specks in the flour, besides the wear and strain upon the cloth. By my construction of the ribs, and by locating them on the outside, the whole amount of the cloth is in use for bolting, and the chop slides easily and gently over the entire interior surface of the cloth, thereby cleaning the chop better, making finer flour, and removing all particles of bran and middlings, and black specks.

The screen E is attached to the arms B B by means of nuts $d\,d$, and said arms fastened to the shaft A by nuts $e\,e$, as shown. G represents a revolving screen, into which the ground grain or chop is passed through a hopper, H, for the purpose of taking out the shells or coarsest bran, and letting the balance of the chop pass through a suitable spout into the screen E of the bolt. The object thereof is to use the shells or coarse bran, in warm and damp weather, to loosen up the chop and overcome its sticky condition, making it bolt better. At other times it may be dispensed with. At both ends of my flour-bolt I use a screen for excluding the bug that produces the mill-worm, and for ventilation to cool the chop, which is of great importance to prevent it from getting hot and sticky. J represents a piece of ticking or other suitable material suspended above and to one side of the bolt, so as to brush against the same and clean the cloth, instead of the knocker heretofore used.

The bolt constructed in the manner above described may be made considerably shorter than those now in use to do the same amount of work, and hence the expense in building or erecting it is materially lessened. Then, having less wear and tear, the cloth will last much longer before it needs repairing or replacing.

K is the spout through which the flour passes from the reel. Inside of this spout is a hinged valve, $h$, provided with a weighted arm, $f$, to hold the valve closed until a certain amount of flour has accumulated on the valve, when the weight thereof opens the valve and allows it to be discharged, and as soon as the flour is discharged the valve closes itself. This prevents bugs from getting into the bolt through the discharge-spout.

Having thus fully described my invention, what I claim as new, and desire to secure by Letters Patent, is—

1. The triangular sectional ribs C C, placed upon the outside of the bolt, having the bolting-cloth D fastened between the sections, and the ribs secured upon the arms B B by means of the nuts $a\ b\ b'$, all substantially as and for the purposes herein set forth.

2. The triangular sectional ribs C, placed upon the outside of the bolt, having the bolting-cloth D fastened between the sections and the arms B, and nuts $a\ b\ b'$, in combination with the screen E, shaft A, and nuts $d\ e$, as and for the purpose herein specified.

In testimony that I claim the foregoing as my own I affix my signature in presence of two witnesses.

JOHN REYNOLDS GAST.

Witnesses:
J. D. S. GAST,
C. Z. BADGER.